Sept. 27, 1966
C. G. BELL
3,275,848
MULTISTABLE CIRCUIT
Filed Sept. 19, 1963
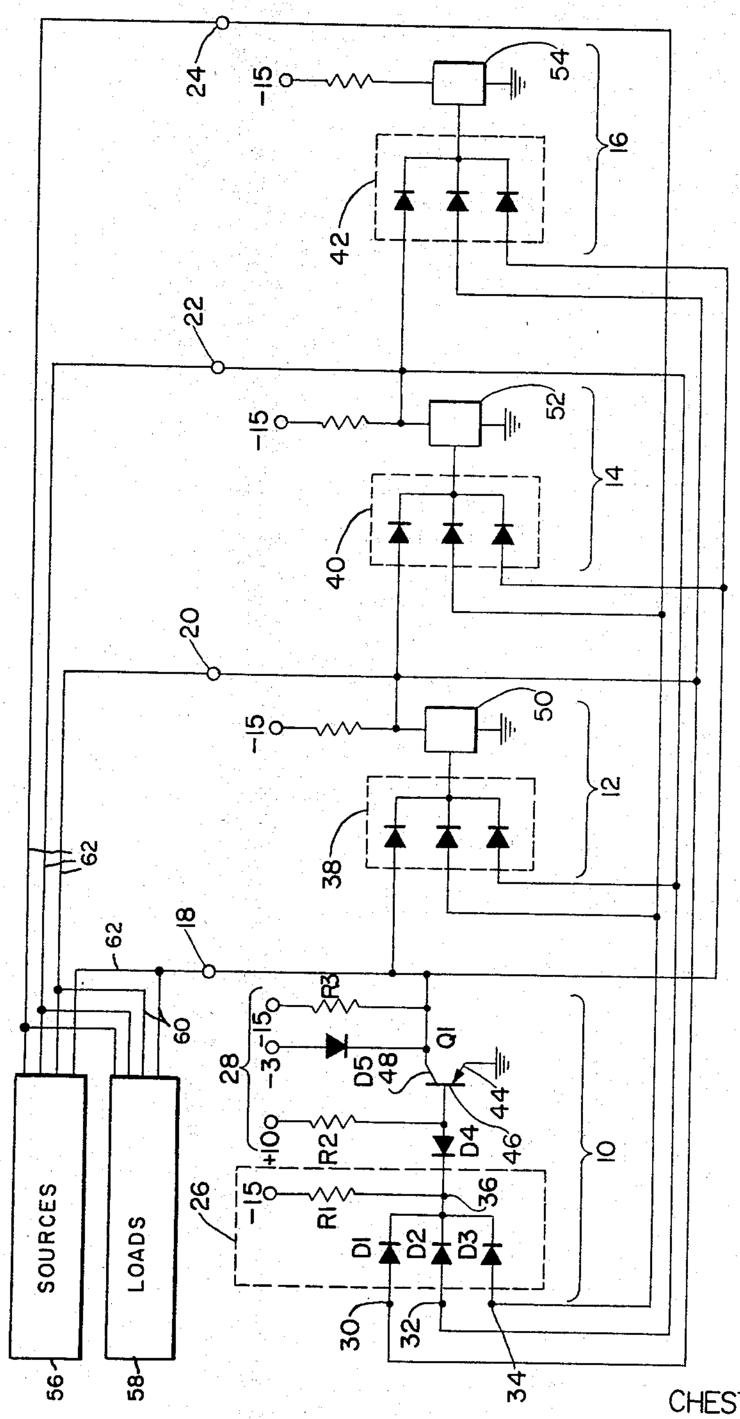
INVENTOR.
CHESTER GORDON BELL
BY
Blair & Buckles
ATTORNEYS United States Patent Office 3,275,848
Patented Sept. 27, 1966

3,275,848

MULTISTABLE CIRCUIT

Chester Gordon Bell, Concord, Mass., assignor to Digital Equipment Corporation, Maynard, Mass.

Filed Sept. 19, 1963, Ser. No. 310,044
8 Claims. (Cl. 307—88.5)

This invention relates to a novel electrical circuit having logic properties particularly suited for use in digital data processing systems. More specifically, it relates to a multistable circuit in which an input pulse applied to one of three or more control terminals causes an output signal in the form of a voltage level to persist exclusively at that terminal. The subsequent arrival of an input pulse at another control terminal switches the circuit so that the output signal is present only at the second control terminal.

It is an object of the invention to provide an improved multistable circuit having three or more stable states.

More particularly, it is an object of the invention to provide a multistable circuit having a simple construction and suited for use in digital data processing systems.

Another object of the invention is to provide a multistable circuit of the above character having rapid response to an input signal.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description, taken in connection with the accompanying drawing, which is a schematic diagram partly in block form of a multistable circuit embodying the invention.

In general, the multistable circuit of the present invention comprises a logic unit for each stable state the circuit can assume. The logic units are interconnected so that application of an input signal to a first logic unit causes the remaining units to assume a first state. This, in turn, causes the first unit to assume a second state, so that the output signal therefrom differs from that of the remaining units. The circuit remains in this condition until another logic unit receives an input signal, which causes the second logic unit to assume the second state and exclude the other units from this state.

The drawing shows a multistable circuit embodying the invention and having four stable states. The multistable circuit comprises four identical logic units 10, 12, 14 and 16, associated with control terminals 18, 20, 22 and 24, respectively.

The first logic unit 10, typical of the other units, has a coincidence circuit 26 whose output is connected to a transistor inverter 28. The output of the inverter 28 is applied to the control terminal 18, associated with the logic unit 10. For the four-stable circuit shown, the coincidence circuit 26 has three input terminals 30, 32, and 34 connected to the control terminals 20, 22 and 24 associated with the other logic units.

As described in detail below, in the illustrated embodiment, the coincidence circuit 26 responds to the application of negative voltage levels to all its input terminals to deliver a negative voltage level to the inverter 28. This causes the inverter to deliver a zero volt level to the control terminal 18. Conversely, the logic unit 10 delivers a negative level to its control terminal 18 when one or more zero volt levels are applied to its coincidence circuit input terminals 30–34.

The control terminal of each logic unit is connected to one coincidence circuit input terminal in each of the other logic units. Accordingly, the control terminal 18 of the logic unit 10 is connected to input terminals of the logic units 12, 14 and 16, and the control terminal 20 of the second logic unit 12 is connected to input terminals of the units 10, 14 and 16. Similarly, the control terminal 22 is connected to input terminals of units 10, 12 and 16 and the fourth logic unit control terminal 24 is connected to input terminals of the first, second and third units, 10, 12 and 14, respectivtly.

During operation, when a zero volt level, preferably in the form of a short pulse from sources 56, is applied to the control terminal 18, it is delivered to input terminals of the coincidence circuits 38, 40 and 42. Accordingly, the logic units 12, 14 and 16 develop negative levels at their control terminals 20, 22 and 24 and at the three coincidence input terminals 30, 32 and 34 of the logic unit 10.

In response to the coincidence of negative levels at all its input terminals, the coincidence circuit 26 enables the inverter 28 to apply a zero volt level to the control terminal 18. This ground level is applied to the other logic units, constraining them to have negative voltage levels at their control terminals 20, 22 and 24. Thus, the multistable circuit maintains a zero volt level at the control terminal 18 and negative levels at the remaining control terminals. These levels are suitably applied to loads 58 having input leads 60, each of which is connected to a control terminal on a different stage 10–16.

Subsequent application of a zero volt level to the fourth unit control terminal 24, for example, rapidly switches the circuit to maintain the zero level at that terminal and the negative level at the control terminals 18, 20 and 22.

Considering, the detailed construction of the illustrated coincidence circuit 26, the input terminals 30, 32 and 34 are connected respectively to the anode of diodes D1, D2 and D3, whose cathodes are connected at a junction 36. A resistor R1 is connected between the junction 36 and a voltage source (not shown) providing a potential of —15 volts. Also connected to the junction 36 is the cathode of a diode D4, whose anode is connected to the base 46 of a transistor Q1. A resistor R2 is connected between the base 46 and a voltage source (not shown) having a potential of +10 volts.

Assume, in the illustrated example, that the voltage level at each input terminal 30–34 can be either —3 volts or zero. With zero voltage at any one of these terminals the diode receiving this voltage clamps the potential at the junction 36 essentially to zero (assuming selection of the resistors R1 and R2 to provide negative potential at the junction 36 in the absence of current through the diodes D1–D3). With a small voltage drop across the diode D4 resulting from current between the resistors R1 and R2, the base 46 is positive with respect to the ground emitter 44 and the transistor Q1 is cut off.

On the other hand, when the negative voltage level is applied to all three of the terminals 30–34, the junction 36 is clamped to the negative level. With the small drop across the diode D4, a substantial negative potential is applied to the base 46, causing the transistor to conduct.

The inverter 28 includes, in addition to the transistor Q1, a diode D5 connected between the transistor collector 48 and a voltage source (not shown) providing the —3 volt level. Also included is a resistor R3 connected between the collector and the —15 volt source. When the transistor Q1 conducts, as a result of the application of the —3 volt level to all three terminals 30–34, the collector 48 is grounded and the zero volt level therefore appears at the terminal 18. When any one of the terminals 30–34 is at the zero volt level, and the transistor Q1 is accordingly cut off, the diode D5 clamps the terminal 18 to the —3 volt level.

Accordingly, it will be apparent that with the zero volt level at the terminal 18, the units 12, 14 and 16 have the —3 volt level at their terminals 20, 22 and 24. Thus all the inputs to the coincidence circuit 26 are at the —3 level to maintain the zero volt level at the terminal 18 as described above. A zero volt pulse at any of the terminals 20–24 will then result in the —3 volt level at the terminal 18. This, in turn, will bring about conditions in the respective logic units providing the zero volt level at the pulsed control terminal and the —3 volt level at all the other control terminals.

In summary, I have described a novel multistable circuit that can be simply constructed at low cost with any desired number of stable states. The circuit is operated by applying a signal, suitably a pulse, to a selected control terminal. In response, the circuit maintains the selected terminal at a selected voltage different from the voltages at the other control terminals.

The invention is clearly not limited to operation with the voltage levels specified above for the illustrated embodiment. For example, the negative and zero volt levels discussed above can both be positive or negative, depending on the choice of operating voltages.

It will thus be seen that the objects set forth above among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described the invention, what is claimed as new and secured by Letters Patent is:

1. An electronic circuit comprising (A) at least three logic circuits, each of which (1) has a plurality of input terminals not exceeding the number of logic circuits and an output terminal, (2) develops a second-level output signal only when all said input terminals receive first-level signals, (3) develops said first-level signal at its output terminal when any one or more of said input terminals receives a second-level signal, (4) has its output terminal connected to an input terminal of each of the other logic circuits so that each input terminal of each logic circuit is connected to an output terminal of another different logic circuit, and (5) is arranged to develop a higher output impedance at its output terminal when it develops said first-level signal than when it develops said second-level signal, (B) whereby in response to application of an input signal of said second level to a first output terminal and, alternatively, application of an input signal of said first level to all output terminals except said first one, said circuit develops at said first output terminal a persisting second-level signal and constrains the signals at the other output terminals to said first level.

2. An electronic circuit according to claim 1 wherein there are only $(n+1)$ logic circuits, where $(n)$ is an integer greater than one, and wherein each logic circuit has only $(n)$ input terminals and a single output terminal.

3. A circuit comprising, in combination, (A) $(n+1)$ coincidence circuits, each having only $(n)$ input terminals and an output terminal, where $(n)$ is an integer greater than one, (1) said coincidence circuits being numbered in an ordered sequence, (B) $(n+1)$ inverters, each having an input terminal and an output terminal, (1) said inverters being numbered in said ordered sequence, (2) said input terminal of each inverter being connected to receive only the signal developed at the output terminal of the same-numbered coincidence circuit, and (3) said output terminal of each inverter being connected in circuit with an input terminal of each of the different-numbered coincidence circuits, (C) each coincidence input terminal being connected within said circuit exclusively to inverter output terminals.

4. An electronic circuit according to claim 3 in which each inverter is arranged to present to said second-level signal a higher output impedance at the output terminal thereof when it develops said first-level signal than when it develops said second-level signal.

5. A multistable circuit comprising, in combination (A) $(n+1)$ AND circuits numbered in an ordered sequence and each having a single output terminal and only $(n)$ input terminals, where $(n)$ is an integer greater than one, (1) each AND circuit responding to the coincidence of first-level signals at all its input terminals to develop a third-level signal at its output terminal, and (2) developing a fourth-level signal at its output terminal when a second-level signal is present at at least one of its input terminals, where said first-level and third-level signals may be the same and where said second-level and fourth-level signals may be the same, (B) $(n+1)$ inverters numbered in said ordered sequence and each having a single input terminal and a single output terminal, (1) each inverter developing at its output terminal said second-level signal in response to application of said third-level signal to its input terminal and (2) developing at its output terminal said first-level signal in response to application of said fourth-level to its input terminal, (3) each inverter having its input terminal connected to the output terminal of the same-numbered AND circuit, (C) $(n+1)$ control terminals numbered in said ordered sequence, (1) each control terminal being connected to the output terminal of the same-numbered inverter circuit and to an input terminal of each of the different-numbered AND circuits, (D) whereby application of a second-level input signal to one control terminal causes each different-numbered AND circuit to deliver a fourth-level signal to the inverter connected to it, thereby producing first-level signals at all the input terminals of the same-numbered AND circuit so that said second-level signal persists exclusively at said one control terminal.

6. A multistable circuit comprising (A) $(n+1)$ coincidence circuits numbered in an ordered sequence and each having an output terminal and no more than $(n)$ input terminals, where $(n)$ is an integer greater than one, (1) each coincidence circuit responding to the coincidence of first-level signals at all its input terminals to develop a third-level signal at its output terminal, and (2) developing a fourth-level signal at its output terminal when a second-level signal is present at at least one of its input terminals (a) where said first-level and third-level signals may be the same and where said second-level and fourth-level signals may be the same, (B) $(n+1)$ inverters numbered in said ordered sequence and each having an input terminal and an output terminal, (1) each inverter having a transistor (a) the base of which is connected to the inverter input terminal and (b) the collector of which is connected to the inverter output terminal, (2) said transistor in each inverter being arranged (a) to have a relatively large collector-emitter resistance when it receives said fourth-level signal at its base and (b) to have a relatively small collector-emitter resistance when it receives said third-level signal at its base, (3) each inverter having its input terminal connected to the output terminal of the same-numbered coincidence circuit, and (C) $(n+1)$ control terminals numbered in said ordered sequence, (1) each control terminal being connected to the output terminal of the same-numbered inverter circuit and to an input terminal of each of the different-numbered coincidence circuits.

7. Logical electrical apparatus comprising (A) a multistable circuit comprising at least three logic circuits, each (1) having a plurality of input terminals and an output terminal, (2) developing a second-level output signal only in response to first-level signals at all its input terminals, (3) developing said first-level signal at its output terminal when one or more second-level signals are applied to its input terminals, and (4) having its output terminal connected to an input terminal of each of the other logic circuits, (B) source means having a plurality of output lines each of which is connected to a different one of said multistable circuit output terminals, and (C) output means having a plurality of input lines each of which is connected to a different one of said multistable circuit output terminals, (D) so that when said source means conditions one output line therefrom to have said second-level signal, said multistable circuit develops at its output terminal connected to said conditioned line a persisting second-level signal and constrains the signals at the other output terminals thereof to said first level.

8. Apparatus according to claim 7 in which each logic circuit (A) includes a grounded-emitter transistor inverter in which the transistor collector is the logic circuit output terminal, and (B) produces said second-level signal when the transistor of the inverter therein is in a conducting state.

References Cited by the Examiner

UNITED STATES PATENTS

| | | | |
|---|---|---|---|
| 3,012,155 | 12/1961 | Jagger | 307—88.5 |
| 3,079,513 | 2/1963 | Yokelson | 307—88.5 |
| 3,166,715 | 1/1965 | Cogar | 307—88.5 |
| 3,178,590 | 4/1965 | Heilweil et al. | 307—88.5 |
| 3,210,569 | 10/1965 | Reek | 328—49 |

ARTHUR GAUSS, *Primary Examiner.*

R. H. EPSTEIN, *Assistant Examiner.*